United States Patent [19]

Haider

[11] Patent Number: 4,834,224

[45] Date of Patent: May 30, 1989

[54] PENDULUM

[76] Inventor: Eduard Haider, Dechantsees 23, D-8591 Pullenreuth, Fed. Rep. of Germany

[21] Appl. No.: 19,274

[22] PCT Filed: May 13, 1986

[86] PCT No.: PCT/DE86/00205

§ 371 Date: Feb. 27, 1987

§ 102(e) Date: Feb. 27, 1987

[87] PCT Pub. No.: WO86/06597

PCT Pub. Date: Nov. 20, 1986

[30] Foreign Application Priority Data

May 14, 1985 [DE] Fed. Rep. of Germany ... 8514525[U]

[51] Int. Cl.⁴ .............. F16F 7/10; F16M 13/00
[52] U.S. Cl. ................. 188/378; 267/182; 248/610; 248/517; 343/DIG. 1
[58] Field of Search .......... 52/108, 229; 248/610, 248/517; 343/DIG. 1; 188/378; 267/90, 182, 131, 136, 150

[56] References Cited

U.S. PATENT DOCUMENTS

| 2,822,896 | 2/1958 | Schuster | 52/108 |
| 3,017,149 | 1/1962 | Bossert | 248/517 X |
| 3,128,330 | 4/1964 | Grasser | 188/378 X |
| 3,221,093 | 11/1975 | Richardson | 188/378 X |
| 3,467,973 | 7/1969 | Minnick | 267/131 X |
| 3,568,805 | 3/1971 | Reed | 188/378 |
| 4,011,397 | 3/1977 | Bouche | 248/74.1 X |
| 4,268,018 | 5/1981 | Langanke | 267/182 X |
| 4,541,420 | 9/1985 | Timm et al. | 52/108 X |
| 4,569,245 | 2/1986 | Feldt et al. | 267/150 X |
| 4,747,799 | 5/1988 | Kato | 464/180 X |

FOREIGN PATENT DOCUMENTS

| 0118263 | 3/1946 | Australia | 248/358 |
| 01229011 | 11/1966 | Fed. Rep. of Germany | 248/610 |
| 0131444 | 8/1983 | Japan | 248/610 |
| 0988266 | 4/1965 | United Kingdom | 267/182 |
| 2066417 | 7/1981 | United Kingdom | 464/180 |

Primary Examiner—Andres Kashnikow
Assistant Examiner—Richard Potosnak
Attorney, Agent, or Firm—Jordan and Hamburg

[57] ABSTRACT

A pendulum for suspending a swinging article from a support structure includes an elongated core having longitudinal ends, enlarged tension heads disposed on each of the longitudinal ends and operable to be engaged and supported by the article and the support structure, a plurality of stiff toroidal elements strung on the elongated core, one of the toroidal elements being a first end toroidal element which is spaced from one of the tension heads, another of the toroidal elements being a second toroidal element which is spaced from the other of the tension heads.

18 Claims, 2 Drawing Sheets

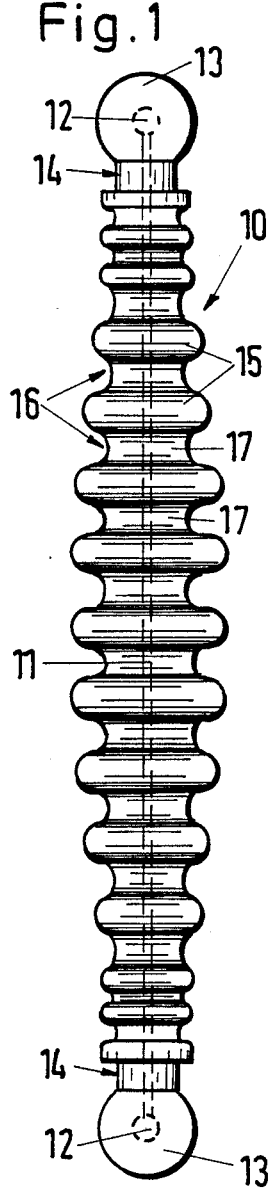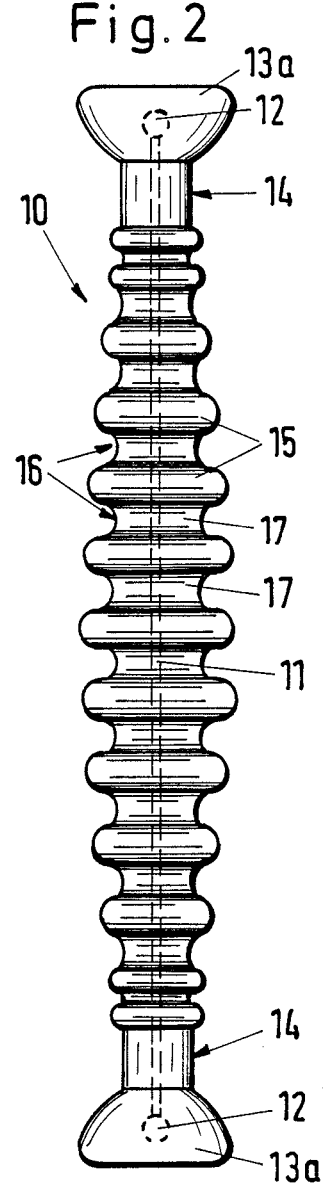

PENDULUM

The innovation refers to a pendulum that is used, in particular, for the swinging suspension of furniture intended as sitting or resting accommodations.

Many experiments have already been carried out in order to replace the up to now widely known static sitting and resting accommodations by dynamic ones.

Thus, it has been known for a long time, that rocking chairs are provided with a dynamic component in comparison to conventional chairs. The same applies also to cradles which have also been known for a long time and which children voluntarily accept because of their dynamic character which has proved to be soporific.

More recently, water beds have appeared on the market as a modern type of dynamic bed. The water bed, however, has considerable disadvantages because of its great space requirements and sluggish responsiveness to movements. It is very heavy and rather expensive, and if the water leaks out, it can cause significant damage. Furthermore, the water bed does not offer any continuous up and down movements and can not assure a steady, invariably horizontal resting surface. In order to overcome to some extent the problems inherent to a water bed, it has recently been provided with safety frames and a safety shell. Thermostatically heating the water ensures that it is automatically kept at a correct temperature. Furthermore, a cover is recommended which is arranged between the water bed and the sheets. Overall, the use of a water bed requires considerable additional expense and still has its problems.

DE-PS No. 1,124,648 describes a swing set or swing bed which requires much space and which, due to its superstructures, would have a visually annoying effect in a bedroom.

DE-PS No. 242,273, furthermore, makes known a seating accommodation which is arranged on pin-ended supports and is in an unstable equilibrium from which it is deflected to a more or less great extent as soon as a momentum is imparted.

From DE-GM No. 1,708,191 is known a seating accommodation suspended from a swing frame which, in case of need, can also be arrested. Such a swing frame as well as the apparatus according to the above-mentioned DE-PS No. 1,124,648 is not suitable for placing in a bedroom or living room.

The same applies to a multitude of prior known swing beds which are provided with bulky frames or which have to be suspended from the ceiling of the room.

Finally, from GB Pat. No. 696,239, there is known a rocking chair which can be shifted to and fro to a certain extent via articulated pendulums. Because of the friction occurring in the articulation points, however, there are required forces for the shifting which are not to be disregarded; an eventual after-swinging being excluded.

In contrast thereto, the object described in the DE-GM No. 82 22 691 wherein the upper portion of the sitting or resting accommodation is suspended via rope pendulums from the bottom portion has considerable advantages. In order to prevent unintentional large deflections and thus possible shocks during the swinging movements, there are provided for this sitting or resting accommodation so-called counter-pendulum for limiting the swinging amplitude to a given value and for avoiding shocks, which counter-pendulums, however, nonetheless safely limit the swinging amplitude when it exceeds certain threshold values.

The innovation is based on the object to provide a suitable pendulum for such sitting or resting accommodations which pendulum has an especially simple construction and is easy to use.

This solution has the considerable advantage that in addition to its not requiring much space and being relatively inexpensive, it provides the person who is resting or sleeping on it at the slightest body movement a maximum of spontaneous movements, while simultaneously safely preventing the pendulum from getting caught or from developing snarls during transport.

Furthermore, if the pendulum is additionally enclosed in an elastically deformable material, it simultaneously also takes over the function of the so-called "counter-pendulum" according to the state of art. Thus there results an optimum swinging behavior and damping behavior.

With reference to figures of the drawings, the innovation will be explained below by way of example. The drawings show the following:

BRIEF DESCRIPTION OF THE DRAWINGS

FIG. 1 is an elevational view of a pendulum with essentially spherical tensioning heads;

FIG. 2 is an elevational view of a modified pendulum with essentially spherical segment-shaped tensioning heads, whereby the flat circular areas thereof face in the opposite direction in relation to the pendulum;

DESCRIPTION OF THE PREFERRED EMBODIMENTS

Figure 3:
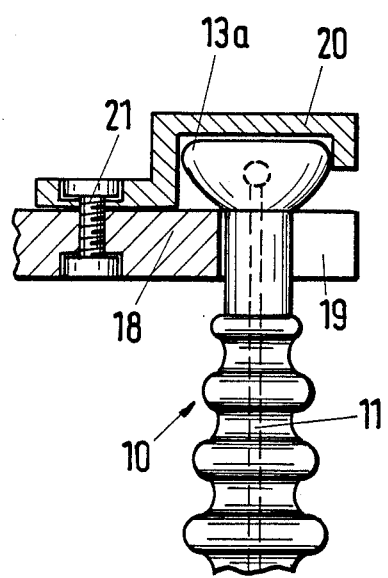
FIG. 3 is an elevational view, partly in section, of a first tensioning mounting of a pendulum with spherical segment-shaped tensioning heads.

The pendulum 10 shown in FIG. 1 is provided on its inside with a core 11 comprised of wire, stranded wire, natural fiber or artificial fiber, whereby the latter two, if necessary, can also be twisted or made into a rope out of a plurality of individual fibers.

At the two ends of the pendulum 10 can be provided enlargements 12 of the core 11 and, if that is the case, so-called tensioning heads 13 are arranged around them.

The length of the pendulum 10 is provided with a series of a plurality of relatively stiff toroidal elements 15 which are arranged at a small distance from one another over almost the entire length of the pendulum. Thus, the arrangement is similar to a strands of pearls. Because these elements 15 are arranged with only a small distance between one another, they safely prevent the pendulum from forming snarls during transport or when exposed to similar effects. The diameter of the relatively stiff elements 15 arranged on the core 11 can increase from the end areas of the pendulum 10 towards the middle. Tensioning beads 13 and 13a are provided at the ends of the pendulum In the proximity of the tensioning heads 13, 13a, a relatively short distance 14 remains without the relatively stiff elements 15 in order to allow an unhindered suspension to the tensioning heads and thus ensures a faultless functioning of the pendulum. Gaps 16 which are located between the individual relatively stiff elements 15 can to a great extent be filled with an elastic material which, in a given case, simultaneously also surrounds the above-mentioned elements 15. An elastic cover 17 is provided and the behavior of the pendulum 10 can be influenced by the strength of the elastic cover 17. An increase of the thickness of this layer increases the damping characteristics. In this way it is possible to realize in one single element the functions of both the pendulum and the counter-pendulum described in the state of art. Due to a plurality of gradations, it is possible to provide a pendulum 10 which is very exactly adapted to the particular requirements, so that it then has only to be selected and suspended. The tensioning heads 13, 13a can thereby be positioned in their functioning position via a lateral slit 19 into a corresponding receiving device 18. Additional installation means are essentially not needed. Special safety measures can be provided for vehicle seats.

The pendulum shown in FIG. 2 has essentially the same construction as the one in FIG. 1 and corresponding parts have the same reference numerals as in FIGS. 1 and 2. Instead of the essentially spherically shaped tensioning head 13 according to FIG. 1, the pendulum 10 in FIG. 2, has tensioning heads 13a which essentially have the shape of a partial spherical segment, wherein a flat circular surface of the partial spherical segment faces in the opposite direction in relation to the actual pendulum 10. As already mentioned for the pendulum according to FIG. 1, also on this pendulum, the gaps 16 between the essentially stiff elements 15 can be filled with an elastic material 17.

FIG. 3 shows an advantageous fixation for the tensioning head 13a. For this purpose the pendulum 10 is inserted by the tensioning head 13a into a receiving device 18 provided with the lateral slit 19, so that the pendulum 10 can be inserted from the side into the slit 19. In the final positioning, the tensioning head 13a is then covered by a holding member 20 which is connected by a screw joint 21 to the receiving device 18.

Figure 4:
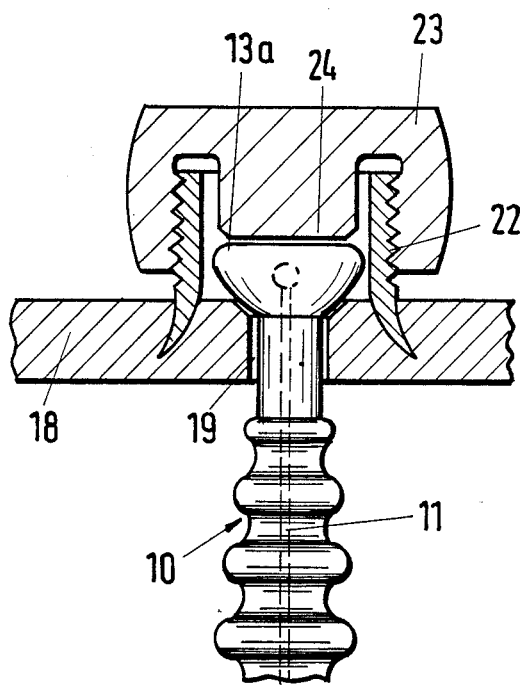
FIG. 4 is a view similar to FIG. 3 of a modified embodiment for the tensioning of a pendulum with spherical segment-shaped tensioning heads.

A corresponding effect can also be realized if, according to FIG. 4, the receiving device 18 having a slit 19 is provided with a screw shaft 22 on the side which is turned away from the actual pendulum 10, which screw shaft 22 is also slotted in alignment with the slit 19. In this case, the tensioning head 13a of the pendulum 10 is lifted above the height of the screw shaft 22 and subsequently positioned within the screw shaft 22. Subsequently, a cap screw 23 is placed on the screw shaft and screwed on. A projection 24 within the cap screw 23 can thereby serve for firmly pressing the tensioning head 13a onto the receiving device 18. Of course, instead of the screw shaft 22 having an external thread as shown in FIG. 4, there could also be provided a screw shaft 22 having an internal thread in which case the projection 24 would be configured as a headless screw.

For the rest, the relationships as described in DE-GM No. 8,222,691 also apply to the above-mentioned pendulum.

For a special embodiment for a car seat, an additional damping between the parts oscillating against one another can be attained, for example, in that the relatively movable parts are braced together via elastic mats. Also, as a precaution, in case of a possible accident, during which there could occur at least a short-term overspeeding of the pendulum 10, there can be provided an elastic springy catching lug on the top and on the bottom for the holding member 20.

I claim:

1. A pendulum for suspending a swinging article from a support structure comprising an elongated core having a longitudinal center portion and longitudinal ends, enlarged tension heads disposed on each of said longitudinal ends and operable to be engaged and supported by said article and said support structue, a plurality of stiff toroidal elements strung on said elongated core said toroidal elements having different maximum outer diameter such that said maximum diameters of said toroidal elements progressively decrease from said center portion towards said longitudinal ends, said toroidal elements being spaced from one another, and elastic means disposed in spaces between said toroidal elements, said elastic means comprising an elastic cover disposed about said toroidal elements to enclose all of said toroidal elements within said elastic cover.

2. A pendulum according to claim 1, wherein said elongated core comprises an elongated element having a generally circular cross-sectional configuration, said elongated element having longitudinal ends, each longitudinal end having an enlargement thereon having a transverse cross-sectional dimension which is greater than the diameter of said elongated element, said tension heads being disposed about said enlargements such that said enlargements retain said tension heads on the longitudinal ends of said elongated element as tension is applied to the pendulum via said tension heads.

3. A pendulum according to claim 2, wherein said tension heads have at least a partial spherical configuration, said tension heads having an inner opening for receiving said enlargements and for receiving a longitudinal end portion of said elongated element.

4. A pendulum according to claim 3, wherein said tension heads have a generally semi-spherical portion and a planar circular end face, said inner opening of said tension head extending to and opening up onto said semi-spherical portion.

5. A pendulum according to claim 4, wherein said planar circular end face is generally perpendicular to the longitudinal extent of said elongated element, said semi-spherical portion being disposed between said planar circular end face and said toroidal elements.

6. A pendulum according to claim 3, wherein said tension heads have a generally spherical configuration.

7. A pendulum according to claim 1, wherein said toroidal elements having different outer diameters.

8. A pendulum according to claim 1, wherein said elongated core comprises a single-coil wire.

9. A pendulum according to claim 1, wherein said elongated core comprises a wire strand.

10. A pendulum according to claim 1, wherein said elongated core comprises natural fibers.

11. A pendulum according to claim 1, wherein said elongated core comprises natural fibers formed into a rope.

12. A pendulum for suspending a swinging article from a support structure comprising an elongated core having longitudinal ends, said elongated core comprising an elongated element having a generally circular cross-sectional configuration, said elongated element having a longitudinal center portion and longitudinal ends, each longitudinal end having an enlargement thereon having a transverse cross-sectional dimension which is greater than the diameter of said elongated element, tension heads disposed on each of said longitudinal ends and operable to be engaged and supported by said article and said support structure, said tension head having at least a partial spherical configuration, said tension heads having an inner opening for receiving said enlargements and for receiving a longitudinal end portion of said elongated element, said tension heads being disposed about said enlargements such that said enlargements retain said tension heads on the longitudinal ends of said elongated element as tension is applied to the pendulum via said tension heads, a plurality of stiff toroidal elements strung on said elongated core said toroidal elements having different maximum outer diameters such that said toroidal elements progressively decreases from said center portion toward said longitudinal ends, said toroidal elements being spaced from one another, elastic means in spaces between said toroidal elements, said elastic means being disposed about said toroidal elements to enclose all of said toroidal elements within said elastic means.

13. Pendulum apparatus for suspending a swinging article comprising a pendulum means, said pendulum means comprising an elongated core having a longitudinal center portion and longitudinal ends enlarged tension heads disposed on each longitudinal end of said elongated core, support means engaged by one of said tension heads for suspending said pendulum means, said pendulum means further comprising a plurality of spaced stiff toroidal elements strung on said elongated core said toroidal elements having different maximum outer diameters such that said maximum diameters of said toroidal elements progressively decrease from said center portion toward said longitudinal ends, said pendulum means further comprising elastic means disposed in spaces between each of said toroidal elements, said support means comprising a receiving element having a lateral slit, said lateral slit having a transverse width greater than the width of said one tension head, said receiving element having a top side and a bottom side, said pendulum means being received and disposed in said slit such that said one tension head is thereby retained on said top side of said receiving element to thereby suspend said pendulum means from said receiving element.

14. Pendulum apparatus according to claim 13, wherein said support means further comprises a holding means for holding said one tension head on said receiving element.

15. Pendulum apparatus according to claim 14, wherein said holding means comprises a holder element extending about said one tension head, and retaining means retaining said holder element on said receiving element.

16. Pendulum apparatus according to claim 15, wherein said retaining means comprises a threaded element threaded to said receiving element.

17. Pendulum apparatus according to claim 15, wherein said retaining means comprises an upright element mounted on said receiving element, said upright element having a hollow interior in which said one tension head is received, said upright element having an external thread, said holder element being threaded to said external thread.

18. Pendulum apparatus according to claim 17, wherein said one tension head has a flat end face, said holder element having an internal projection which projects into said hollow interior of said upright element, said projection engaging said flat end face of said one tension head.

* * * * *